Figure 1:
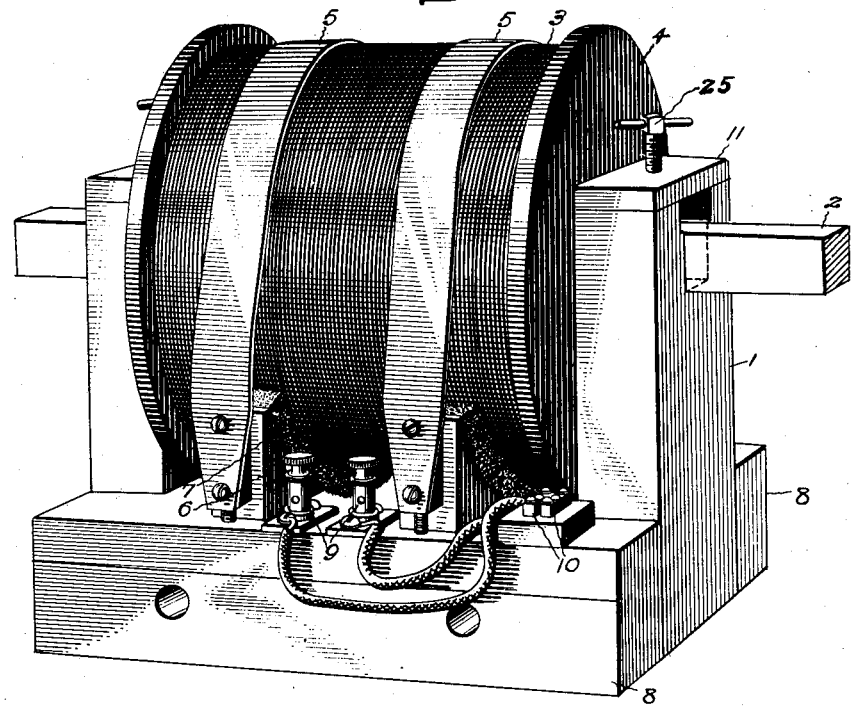

Aug. 25, 1925.

S. L. GOKHALE 1,551,383

METHOD AND APPARATUS FOR TESTING MAGNETIC MATERIAL

Filed May 15, 1923

Inventor:
Shankar L. Gokhale,
by *[signature]*
His Attorney.

Patented Aug. 25, 1925.

1,551,383

UNITED STATES PATENT OFFICE.

SHANKAR L. GOKHALE, OF SCHENECTADY, NEW YORK, ASSIGNOR TO GENERAL ELECTRIC COMPANY, A CORPORATION OF NEW YORK.

METHOD AND APPARATUS FOR TESTING MAGNETIC MATERIAL.

Application filed May 15, 1923. Serial No. 639,193.

*To all whom it may concern:*

Be it known that I, SHANKAR L. GOKHALE, a citizen of the United States, residing at Schenectady, in the county of Schenectady, State of New York, have invented certain new and useful Improvements in Methods and Apparatus for Testing Magnetic Material, of which the following is a specification.

My invention relates to a method and apparatus for determining certain characteristics of magnetic material and more in particular to the saturation value of magnetic material.

Heretofore, so far as I am aware, there has been no practical method or apparatus for determining this value in magnetic material. By means of my invention the saturation value of ordinary samples of magnetic material such as the iron used in the magnetic circuits of electrical apparatus can be directly and readily determined with good accuracy without any corrections and with practically no calculations.

My method is based on the fundamental formula $B = 4\pi J + H$ where B represents flux density, J magnetic intensity, $4\pi J$ the saturation value, and H the magnetizing force, and on the assumption that J and $4\pi J$ in a magnetic body becomes constant as soon as saturation is reached and that H in a correctly proportioned apparatus is proportional to the magnetizing current. These assumptions are highly probable as has been determined by various previous investigators.

It may be said that with values of current above that necessary to produce saturation in an iron core, the coil acts in all respects as if no iron were present. I take advantage of this phenomenon or change which occurs at the saturation point in an iron core coil to eliminate or neutralize the H component in the above mentioned formula whereby the value of J or the magnetic intensity may be measured directly. This measurement is accomplished by an apparatus having an exciting coil wound about the sample to be tested. This coil is connected in series with a primary winding of a variable mutual inductance, a current regulator and a suitable force of direct current. Also wound on the sample to be tested is an exploring coil which is connected in series with a deflection galvanometer and the secondary winding of the variable mutual inductance. The mutual inductor is so connected that the voltage of the secondary is opposed to the voltage of the exploring coil whenever a change in the exciting current takes place and the mutual inductance is adjusted to such a value that its effect is equal to the effect of the mutual inductance between the main exciting coil and the exploring coil when the sample upon which the latter two coils are wound is saturated. With such an arrangement, it will be evident that changes in the current of the exciting circuits which are above a value sufficient to produce saturation in the sample under test, will produce no deflection of the galvanometer, but that changes which are below such a value will produce a deflection of the galvanometer, because in the latter case the voltage of the secondary of the variable mutual inductance coil is no longer equal to the voltage induced in the exploring coil. This is due to the presence of the magnetic flux stored in the iron core sample which now decreases and in so doing induces in the galvanometer circuit a predominating current which deflects the galvanometer. It will therefore be seen that if the sample is over-saturated and the exciting circuit is quickly reversed, the resulting galvanometer deflection will be directly proportional to the saturation value of the sample or proportional to J in the formula $B = 4\pi J + H$.

Figure 2:
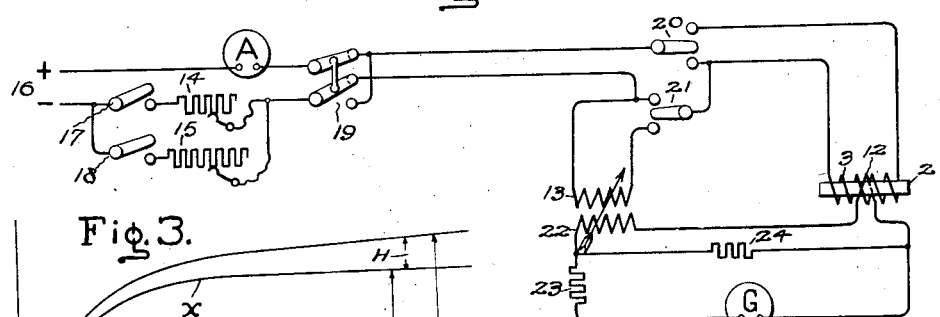

The features of my invention which I believe to be novel and patentable will be pointed out in the claims appended hereto. The apparatus and its method of use will now be explained in connection with the accompanying drawings in which Fig. 1 is a perspective view of the exciting coil used for determining the saturation value of magnetic material, a sample of which is shown inserted through the coil; Fig. 2 represents the circuit connections which may be used with my improved testing apparatus, and Fig. 3 a curve plotted from the results of a test with my apparatus.

Referring to Fig. 1, 1 represents a yoke of magnetic material adapted to form, with a sample 2 to be tested, the magnetic circuit of an exciting coil 3. Coil 3 is wound on a suitable spool 4 and is held in place between the ends of the yoke by means of non-magnetic straps 5. Preferably the spool rests in a suitable cradle 6 provided with pad 7 to prevent abrasion of the insulation on the coil 3. The side pieces 8 of the base are made of non-magnetic material such as wood and are secured to the magnetic yoke in any convenient manner. This base supports the cradle 6, the terminals 9 of the exciting coil 3 and the terminals 10 of a small exploring coil which is wound about the sample 2 near the center of coil 3 as represented at 12 in Fig. 2. In order to secure good magnetic contact between the sample 2 and the yoke 1, the upright ends of the yoke are forked or provided with openings and each is provided with a keeper 11 and a thumb-screw 25. After the sample 2 is inserted in place through coils 3 and 12 the thumb-screws are turned down to clamp the sample firmly in contact with the abutting surfaces of yoke 1.

Referring now to Fig. 2, which shows the electric circuit connections of my improved testing apparatus, 2 represents the sample to be tested with its exciting coil 3 and exploring coil 12. The exciting coil 3 is adapted to be connected in series with a primary winding 13 of a variable mutual inductance, an ammeter A and adjustable resistances 14 and 15 to a source of direct current 16. Switches 17 and 18 permit one or both of the resistances 14 and 15 to be included in the circuit; switch 19 permits the current to coils 3 and 13 to be reversed and switches 20 and 21 permit either one or both of the coils 3 and 13 to be included in the exciting circuit. The exploring coil 12 is connected in series with a secondary coil 22 of the variable mutual inductance and in series with a deflection galvanometer G. Suitable calibrating resistances 23 and 24 are preferably associated with the galvanometer circuit.

In preparing the apparatus for test the galvanometer is first calibrated so that its graduations represent some multiple of a unit for measuring the value of B. Next it is assured that the voltage induced in coil 22 from the exciting circuit will oppose the voltage induced in coil 12 by the same current. A convenient way of determining this is to first connect coil 13 in the exciting circuit without coil 3 and note the direction of the galvanometer deflection when the exciting circuit is broken. Then repeat the operation with only coil 3 in the exciting circuit. If the direction of the galvanometer is different in the two cases the coils are correctly connected. If the deflections are in the same direction, the leads of one coil should be reversed. The next operation is to adjust the mutual inductance between coils 13 and 22 to such a value that its effect is equal to the effect of the mutual inductance of coils 3 and 12, when there is no effect of magnetic material in these coils. In doing this the mutual inductance is adjusted to such a value that the increment of interlinkage in its secondary for any increment of current in its primary is equal to the increment of interlinkage for the same increment of current in the magnetizing coil, for all increments of current above the saturation value. This setting may be approximately calculated, or it may be made by connecting coils 3 and 13 in series and adjusting the mutual inductance 22, 13, when there is either no sample or a magnetically saturated sample threading the test coil, until no deflection of the galvanometer is obtained upon changing the current in the exciting circuit. Next the sample 2 which is to be tested is inserted in the testing apparatus as indicated in Fig. 1.

Since the test is always made on a fully saturated sample, it is first important to determine that the sample can be and is saturated. This may be done as follows: Coils 13 and 3 are connected to a source of supply through ammeter A with the sample 2 in place. Let us assume that the current flowing in the circuit with a given setting of rheostat 14 and with switch 18 open, is 12 amperes. By means of the rheostat 14 the current is adjusted to a value which is expected to produce saturation, say 12 amperes. Now, raise the current to 17 amperes by closing switch 15. If the galvanometer shows a small deflection, the mutual inductance is adjusted until there is no deflection of the galvanometer when the above increase in current is made. Now, repeat the test starting with 12 amperes and using different maximum values of current, for example, 13, 14, 15, 16, 18, 19 and 20 amperes. If there is no deflection of the galvanometer in all of these cases, it may be concluded that the sample is saturated with 12 amperes flowing in the circuit. If, on the contrary, there is a deflection in any of the several tests, the sample is not saturated at 12 amperes. In this case the test must be repeated with a higher starting current. The value of exciting current just sufficient to produce saturation may be determined with exactness if desired. The operator having assured himself that the sample is fully saturated now reverses the circuit and observes the galvonometer deflection which is directly proportional to the saturation value of the sample. Preferably it will be desirable to reverse the current in the exciting circuit by means of switch 19 in order to obtain a double deflection of the galvonometer and to eliminate the error which might be caused by residual megnatism. Since the galvonometer was previously calibrated the resulting deflection gives the saturation value of the sample without any further correction or computation. In making this test it is not necessary to measure, with exactness, the magnetizing current above the saturation value of current, since the H component, which is proportional to the exciting current, cancels out due to the balanced opposing action of the variable mutual inductance between the coils 13 and 22 and the mutual inductance between coils 3 and 12.

The J factor, which is proportional to the magnetic intensity of the iron sample produces the entire galvanometer deflection and since this intensity is measured when the sample is fully saturated, the measurement gives the saturation value. In making such a test it will be preferable to take several readings at different values of current and plot the results in the form of a curve.

In order that a more comprehensive understanding of my invention may be had, I will give below the important specifications of an actual test apparatus and the results obtained in actual test. The coil 3 contained 2638 turns of .081" diameter copper wire wound in 30 layers. This coil is capable of carrying 20 amperes for 5 minutes with a temperature rise of 40° centigrade. This coil was proportioned to make H proportional to the exciting current. The exploring coil 12 contained 208 turns wound on a hard rubber spool which was slipped inside of coil 3. The value of H per ampere of the magnetizing current may be computed from the formula $$H = \frac{M}{10\,NA}$$

where N is the number of turns in coil 12, A the area inclosed by this coil and M the value of the variable mutual inductance used. Substituting the actual value.

$$H = \frac{.725 \text{ millihenrys} \times 100000}{208 \text{ turns} \times 2.29 \text{ sq. cm.}} = 152 \text{ gausses per ampere.}$$

The galvanometer was calibrated so that a double deflection, that is to say, a deflection caused by a reversal of the current in the exciting circuit, gave a reading representing 1/100 of B. The following test data was obtained:

| Exciting current amps. | H (152×I) | Gal. deflection | (4πJ) |
|---|---|---|---|
| 20 | 3040 | 206.5 | 20650 |
| 18 | 2730 | 206.5 | 20650 |
| 16 | 2430 | 206.5 | 20650 |
| 15 | 2280 | 206.5 | 20650 |
| 14 | 2120 | 206.5 | 20650 |
| 13 | 1975 | 206.5 | 20650 |
| 12 | 1820 | 206.5 | 20650 |
| 11 | 1670 | 206.5 | 20650 |
| 10 | 1520 | 206.5 | 20650 |
| 9 | 1370 | 206.5 | 20650 |
| 8 | 1220 | 206.20 | 20650 |
| 5 | 750 | 205.20 | 20520 |
| 3 | 450 | 201. | 20100 |

Figure 3:
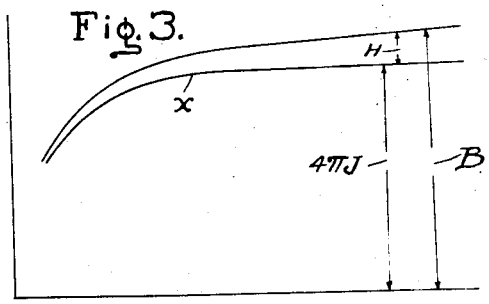

The values of $4\pi J$ may be plotted as in Fig. 3. If we add to the value of $4\pi J$ the corresponding values of H, we obtain the values of B which may be plotted as indicated. The point X of the $4\pi J$ curve is the point where this value becomes constant and consequently is the saturation point of the sample.

The specifications of the testing apparatus herein given are only for the purpose of illustration and I do not wish to be limited in any way to the specifications and dimensions as here given because it will be evident to those skilled in the art that the dimensions and proportions of the coils may be varied to suit various different conditions and samples of iron.

What I claim as new and desire to secure by Letters Patent of the United States, is:

1. The method of determining the saturation value ($4\pi J$) of magnetic material which consists in saturating a sample of said material, producing an electromotive force in a measuring circuit proportional to the flux density (B), opposing said electromotive force by a second electromotive force proportional to the magnetizing force (H) and measuring the difference between said opposing electromotive forces.

2. Apparatus for determining a characteristic of magnetic material comprising a magnetizing coil and a test coil arranged to enclose the sample to be tested, a mutual inductance having its primary connected to be influenced by the current in said magnetizing coil and its secondary connected to oppose the electromotive force of the test coil and measuring means associated with the test coil circuit.

3. Apparatus for determining the saturation value of magnetic material comprising magnetizing and test coils adapted to be threaded by the sample to be tested, a variable mutual inductance having primary and secondary coils in series with said magnetizing and test coils respectively, said mutual inductance being connected so that the effect of its secondary is opposed to the effect of said test coil and a galvanometer connected to be influenced by said test coil.

4. Apparatus for determining the characteristics of magnetic material comprising a magnetizing coil and a primary coil of a variable mutual inductance arranged to be connected in series with a source of supply, an ammeter, a reversing switch and a variable resistance in series with said coils and said source of supply, a test coil associated with said magnetizing coil in such manner that a sample of magnetic material may be inserted through both of said associated coils, a galvanometer connected in the circuit of said test coil and a secondary coil of said mutual inductance connected in opposition to said test coil.

5. Apparatus for determining the saturation value of magnetic samples comprising means for saturating a sample, a test coil arranged to be threaded by said sample, means for opposing the effect of the magnetizing force on said test coil above the saturation value and means for measuring the electromotive force of said test coil due to the saturation value of said magnetizing force.

In witness whereof, I have hereunto set my hand this 10th day of May, 1923.

SHANKAR L. GOKHALE.